United States Patent [19]

Ryoke et al.

[11] Patent Number: 4,696,858

[45] Date of Patent: * Sep. 29, 1987

[54] MAGNETIC RECORDING MEDIUM

[75] Inventors: Katsumi Ryoke; Nobutaka Yamaguchi; Masatoshi Takahashi; Kazuko Hanai; Hideaki Kosha; Eiichi Tadokoro, all of Kanagawa, Japan

[73] Assignee: Fuji Photo Film Co., Ltd., Kanagawa, Japan

[*] Notice: The portion of the term of this patent subsequent to Apr. 15, 2003 has been disclaimed.

[21] Appl. No.: 789,221

[22] Filed: Oct. 18, 1985

[30] Foreign Application Priority Data

Oct. 19, 1984 [JP] Japan ............... 59-218636

[51] Int. Cl.$^4$ ............................... G11B 5/70
[52] U.S. Cl. ................... 428/323; 427/131; 428/694; 428/900
[58] Field of Search ............ 428/694, 695, 900, 408, 428/323; 427/131; 360/134–136

[56] References Cited

U.S. PATENT DOCUMENTS 4,135,031 1/1979 Akashi et al. ............ 428/694
4,474,843 10/1984 Miyoshi et al. ............ 428/900
4,546,038 10/1985 Yamaguchi et al. ............ 428/900
4,582,757 4/1986 Miyoshi et al. ............ 428/900
4,598,014 7/1986 Miyoshi et al. ............ 427/131

Primary Examiner—Paul J. Thibodeau
Attorney, Agent, or Firm—Sughrue, Mion, Zinn, Macpeak, and Seas

[57] ABSTRACT

A magnetic recording medium is described, comprising a non-magnetic support having provided thereon a magnetic layer being provided on one surface of the support and a backing layer being provided on the surface of the support opposite to said magnetic layer, the backing layer containing (A) a binder comprised of resin having a 100% modulus of 150 kg/cm$^2$ or less present in an amount of 50 to 95 wt % based on the total weight amount of binder and (B) non-magnetic particles comprised of (i) carbon black having an average particle size of more than 0.1 μm to 1.0 μm, and (ii) carbon black having an average particle size of 0.01 μm to 0.1 μm in a weight ratio of carbon black (i)/carbon black (ii) of 95/5 to 5/95, with the non-magnetic particles in the backing layer being present in an amount of 40 to 300 parts by weight per 100 parts by weight of the total binder.

5 Claims, No Drawings

MAGNETIC RECORDING MEDIUM

FIELD OF THE INVENTION

The present invention relates to a magnetic recording medium, and more particularly it relates to a magnetic recording medium comprising a support having a magnetic layer and a backing layer which is provided on the surface of the support opposite to the magnetic layer in order to obtain a highly sensitive magnetic recording medium which reduces drop out and improves video S/N.

BACKGROUND OF THE INVENTION

Recently, there have been requirements to make a more sensitive magnetic recording medium. If the magnetic recording medium is made more highly sensitive, a high image quality as well as a good sound quality and high density recording can be realized. These improvements can be attained by improving the recording system of a deck used for magnetic recording and reproducing system of a magnetic recording medium and also by improving the magnetic recording medium.

A magnetic recording medium can be highly sensitized by increasing the signal and decreasing the noise in the signal/noise ratio. The signal can be increased by increasing the residual magnetic flux density and coercive force of the magnetic recording media, which can be realized by making the ferromagnetic particles finer or adjusting the shape of anisotropy and the arrangement of the single magnetic domain of each ferromagnetic fine particles.

The noise can be decreased by various factors, for example, by smoothing a magnetic layer and controlling the electrification properties of magnetic recording media. Japanese Patent Publication (Examined) No. 3927/75, Japanese Patent Application (OPI) Nos. 111828/82 and 96505/77 (the term OPI" as used herein refers to "published unexamined Japanese patent application") and U.S. Pat. No. 4,135,031 disclose that a backing layer can be provided in order to control the electrification properties of a magnetic recording medium and to maintain running durability thereof.

However, it is impossible to obtain a statisfactory magnetic recording medium having high sensitivity and sufficient running durability by the above described technology. There are a number of reasons why it has not been possible to obtain such satisfactory magnetic recording medium: thus (1) although spacing loss between a magnetic recording and reproducing head, and a magnetic recording medium can be reduced by smoothing a surface of the magnetic recording medium, running durability deteriorates and friction coefficient increase, whereby the magnetic layer is peeled part; (2) if a surface of a backing layer is made coarse to improve running durability thereof, the surface roughness of the backing layer is transferred to the magnetic layer. Thereby, the signal/noise ratio of the magnetic layer is decreased; (3) at an initial stage of running of a magnetic recording medium that the magnetic layer and the backing layer are not yet peeled apart, drop out (the term "drop out" herein means such level changes that recording skips instantaneously by dust and powders (hereinafter, referred to as a "scraped powders") which come off from a magnetic layer upon running) increases, thereby decreasing the signal/noise ratio; (4) when a calender forming method is conducted to obtain a smooth surface of a magnetic layer and to obtain a highly sensitive magnetic recording, as disclosed, for example, in U.S. Pat. No. 3,916,039, the backing layer readily is peeled apart, and therefore, it is difficult to manufacture a magnetic recording medium having such a smooth surface on the magnetic layer; and (5) the tape edge becomes waving like a seaweed, after repeated run, thereby deteriorating audio level change.

SUMMARY OF THE INVENTION

As a result of various investigations, the inventors of the present invention have found that drop out occurring at an initial stage and after repeated run, is caused by dust and scraped powders which stays on the magnetic recording medium. In many cases, adhesion of dust is influenced by the arrangement and the insulating or non-insulating properties, of the running guide of magnetic tapes on a deck for magnetic recording and reproducing and the running speed of the magnetic tape. Particularly in a magnetic recording medium, adhesion of dust is influenced by the electrification properties and surface electric resistance thereof. Electrification properties include not only properties of surface electric resistance of the magnetic recording medium but also those of tribo-electric potential of the medium. Therefore, particles and binder resin should carefully be selected in light of the above properties. They should also carefully be selected in light of the fact that a backing layer has a tendency to readily peel apart and a tape edge has a tendency to readily become waving like a seaweed in calendering process. Further, the surroundings where a magnetic recording medium runs are important, because they have a close and complicated relation with the electrification properties of dust and the temperature and humidity have an effect on the electrification properties thereof. Considering the friction properties, the inventors of the present invention have found a satisfactory backing layer, which the signal/noise ratio of the magnetic layer does not decrease, although the surface roughness of the backing layer is transferred to the magnetic layer.

A first object of the present invention is to provide a magnetic recording medium having reduced drop out and a better signal/noise ratio by providing a novel backing layer, and no having the deformation that the tape edge of the medium become waving like a seaweed.

A second object of the present invention is to provide a magnetic recording medium comprising a backing layer having good running properties.

A third object of the present invention is to provide a highly sensitive magnetic recording medium comprising a backing layer, having a surface roughness which does not affect the signal/noise ratio of the magnetic layer.

A fourth object of the present invention is to provide a magnetic recording medium comprising the backing layer which is not peeled part when a pressure forming (i.e., a calendering process, suitable temperature: 40° to 100° C.) is carried out.

The inventors of the present invention have made studies with the aim of removing the defects of the prior art and have found that the above objects of the invention can be accomplished by the following invention.

That is, the present invention relates to a magnetic recording medium comprising a non-magnetic support having provided thereon a magnetic layer being provided on one surface of the support and a backing layer being provided on the surface of the support opposite to the magnetic layer, the backing layer containing (A) a binder comprised of resins having a 100% modulus of 150 kg/cm$^2$ or less present in an amount of 50 to 95 wt % based on the total weight amount of binder, and (B) non-magnetic particles comprised of (i) carbon black having an average particle size of more than 0.1 μm to 1.0 μm and (ii) carbon black having an average particle size of 0.01 μm to 0.1 μm in a weight ratio of carbon black (i)/carbon black (ii) of 95/5 to 5/95, with the non-magnetic particles in the backing layer being present in an amount of 40 to 300 parts by weight per 100 parts by weight of the total binder.

DETAILED DESCRIPTION OF THE INVENTION

The present invention is illustrated in more detail.

Finely ferromagnetic particles which can be used in the magnetic layer of the present invention include those ferromagnetic particles having a specific surface area (B.E.T. Method) measured by the nitrogen adsorption method of 25 m$^2$/g or more, preferably 30 m$^2$/g or more, such as [65 -Fe$_2$O$_3$, Co-containing γ-Fe$_2$O$_3$, Fe$_3$O$_4$, Co-containing Fe$_3$O$_4$, CrO$_2$, Co-Ni-P alloy, Co-Ni-Fe alloy and barium ferrite.

Specific examples are disclosed in Japanese Patent Publication Nos. 14090/69, 18372/70, 22062/72, 22513/72, 28466/71, 38755/71, 4286/72, 12422/72, 17284/72, 18509/72 and 18573/72.

Further, ferromagnetic particles, powders, additives, supports and a method for preparing a magnetic recording medium are disclosed in U.S. Pat. No. 4,135,016.

The dry thickness of the magnetic layer is preferably 0.5 to 15 μm.

The backing layer of the present invention contains non-magnetic particles, and especially contains non-magnetic carbon black particles of two special type.

The first special type of carbon black used in the backing layer of the present invention includes M.T. (Medium Thermal), F.T. (Fine Thermal) and furnace carbon corresponding to M.T. and F.T., having an average particle size of more than 0.1 μm to 1.0 μm, as classified in the carbon black industry. These carbon blacks are commercially available in the trade names of "HTC#20" manufactured by Nittetsu Kagaku Co., Ltd., "Sevacarb M.T." manufactured by Sevalco Co., Ltd., "Huber N990" manufactured by Huber Co., Ltd., "Raven MTP" manufactured by Columbian Co., Ltd., and "Thermax" manufactured by Carbarb Co., Ltd. The specific surface area measured by the nitrogen adsorption method of these carbon black is 25 m$^2$/g or less and these carbon blacks have scarcely a chain structure. Excessive dispersing powder is required to blend carbon black and a binder, and generally it tends to break the structure of carbon black. However, if carbon black and binder are not sufficiently blended, the backing layer is easily peeled part after coating. But, carbon black corresponding to M.T. and F.T. or furnace carbon corresponding to F.T. which has no chain structure or has scarcely chain structure is well blended with a binder and when the carbon is used, the surface electric resistance of a coated layer occuring while dispersing does not increased. These carbon blacks can make a surface of the backing layer properly coarse, and with the combination of the following resins, particles and binder ratio, and polyisocyanate, better durability can be obtained. The average particle size of these carbon black is more than 0.1 μm to 1 μm, preferably 0.1 μm to 0.5 μm.

The second special type of carbon black used in the backing layer of the present invention is furnace carbon having an average particle size of 0.01 μm to 0.1 μm. This carbon black is commercially available in the trade names of "Asahi #80", "Asahi #70", "Asahi #60H", "Asahi#60", "Asahi #50" and "Asahi Thermal" manufactured by Asahi Carbon Co., Ltd. Of these carbon blacks, the preferred carbon blacks have an average particle size of 0.015 μm to 0.095 μm. The above-described carbon black having an average particle size of more than 0.1 μm to 1.0 μm and the second carbon black having an average particle size of 0.01 μm to 0.1 μm are used in the ratio of 95/5 to 5/95, preferably 80/20 to 20/80 to control surface properties and prevent edge waving, as well as to control the surface electric properties. A preferred surface roughness of the backing layer shown by Ra in cut off of 0.8 mm measured in accordance with JIS B-0601-1982 is 0.08 to 0.2 μm, and more preferably 0.09 to 0.16 μm.

The binder used in the backing layer of the present invention comprises conventionally used thermoplastic resins, thermosetting resins, reactive type resins and mixtures thereof.

The thermoplastic resins which can be used in the backing layer are resins having a softening temperature of 150° C. or less, an average molecular weight of 10 000 to 200,000, preferably 20,000 to 140,000 and a degree of polymerization of about 200 to 2,000, preferably 250 to 1,000 such as a copolymer of vinyl chloride and vinyl acetate, a polyurethane resin, a phenoxy resin, an epoxy resin, a polyester resin, a copolymer of acrylic acid ester and styrene, a copolymer of methacrylic acid ester and styrene, a copolymer of methacrylic acid ester and acrylonitrile, a copolymer of methacrylic acid ester and styrene, urethane elastomer, nylon and silicon type resin, a copolymer of butadiene and acrylonitrile, a polyamide resin, polyvinyl butyral, cellulose derivatives (cellulose acetate butylate, cellulose diacetate, cellulose triacetate, cellulose propionate), a copolymer of styrene and butadiene, a polyester resin, a copolymer of chlorovinyl ether and acrylic acid ester, an amino resin, various synthetic rubber type thermoplastic resins and the mixture thereof.

Preferred resins which can be used in the backing layer of the present invention are resins which have a 100% modulus, as defined in accordance with JIS K-6301, of 150 kg/cm$^2$ or less, preferably 120 kg/cm$^2$ or less, among resins as described above, and are used in an amount of 50 to 95 wt % based on the total weight amount of binder, and particularly the resins having a 100% modulus of 120 kg/cm$^2$ or less are preferably used in an amount of 50 to 95 wt % based on the total weight amount of binder. If the binder contains a resin having a 100% modulus of more than 150 kg/cm$^2$, scratches are readily formed on the backing layer and drop out increases. Of those resins having 150 kg/cm$^2$ or less of 100% modulus, typical commercially available resins which have a 100% modulus of 150 kg/cm$^2$ or less are "DN-4805" (100% modulus=50 kg/cm$^2$), "DN-4806" (100 kg/cm$^2$), "DN-4830" (120 kg/cm$^2$), "N2302" (Nippollan N 2302) (25 to 40 kg/cm$^2$) and "N2304" (Nippollan N 2304) (15 to 30 kg/cm$^2$). All of them are a polyurethane manufactured by Nippon Polyurethane Co., Ltd.

The binder used in the backing layer of the present invention also is comprised of a polyisocyanate type hardening agent (i.e., a polyfunctional isocyanate which is derived from a diisocyanate compound and a polyhydric alcohol (polyol)). Polyisocyanate type hardening agents which can be used in the backing layer of the present invention are commercially available in the trade names of "Millionate MT", "Millionate MR", "Collonate 2014", "Collonate 3040" and "Collonate 2061", manufactured by Nippon Polyurethane Co., Ltd.

Resins having a 100% modulus of 150 kg/cm² or less are used in an amount of about 50 to 95 wt % based on the total weight amount of binder, to reduce scratches on a tape made by dust between guide systems, because these resins are considered to absorb the shock of the dust. At the same time, a backing layer is required to be tough, and this property is imparted to the backing layer by the polyisocyanate type harding agent having high-speed hardening performance. The polyisocyanate type harding agent is used in an amount of preferably 15 to 40 wt % based on the total weight amount of binder (i.e., resins having a 100% modulus of 150 kg/cm² or less, other resins and hardening agents).

The binder used in the backing layer of the present invention can contain resin other than the above described resin having a 100% modulus of 150 kg/cm² or less, and such other resin can be selected from these conventionally known thermoplastic resins, thermosetting resins, reactive type resins or mixtures thereof. The other resins are employed in an amount of 50 wt % or less based on the total weight amount of binder, and have a softening temperature of 150° C. or lower and an average molecular weight of 10,000 to 200,000, preferably 20,000 to 140,000 and a polymerization degree of about 200 to 2,000, preferably 250 to 1,000. Specific examples are copolymer of vinyl chloride and vinyl acetate, a copolymer of vinyl chloride and vinylidene chloride, a copolymer of vinyl chloride and acrylonitrile, a copolymer of acrylic acid ester and acrylonitrile, a copolymer of acrylic acid ester and vinylidene chloride, a copolymer of acrylic acid ester and styrene, a copolymer of methacrylic acid ester and acrylonitrile, a copolymer of methacrylic acid ester and vinylidene chloride, a copolymer of methacrylic acid ester and styrene, an urethane elastomer, nylon and silicon type resin, a nitrocellulose and polyamide resin, a polyvinyl fluoride, a copolymer of vinylidene chloride and acrylonitrile, a copolymer of butadiene and acrylonitrile, a polyamide resin, a polyvinyl butyral, cellulose derivatives (cellulose acetate butyrate, cellulose diacetate, cellulose triacetate, cellulose propionate and nitrocellulose), a copolymer of styrene and butadiene, a polyester resin, a copolymer of chlorovinyl ether and acrylic acid ester, an amino resin, various synthetic rubber type thermoplastic resins and the mixture thereof.

Specific examples thereof are disclosed in Japanese Patent Publication Nos. 6877/62, 12528/64, 19282/64, 5349/65, 20907/65, 9463/66, 14059/66, 16985/66, 6428/67, 11621/67, 4623/68, 15206/68, 2889/69, 17947/69, 18232/69, 14020/70, 14500/70, 18573/72, 22063/72, 22064/72, 22068/72, 22069/72, 22070/72 and 27886/72.

In addition to the non-magnetic carbon black particles, the backing layer of the present invention preferably contains other non-magnetic fine particles (hereinafter, referred to as a "other fine particles"). Examples of such other non-magnetic fine particles which can be used in the backing layer of the present invention include $TiO$, $TiO_2$, Talc, $BaSo_4$, $CaCO_3$, graphite, $(CF)_n$, $(BF)_n$, $SiO_2$, $MoS_2$, $ZnO$, $\gamma$-$Fe_2O_3$, $Al_2(SiO_3)_2$, $Al_2O_3$, $CaSio_3$, Zeolite, $MgCO_3$, $BaCO_3$, $Cr_2O_3$, SiC, silicon nitride, zirconium silicate, MgSiO, a benzoguanamine resin, CsO, BeO, $(CB)_n$, and $Mg(OH)_2$. Of these particles whose surface electric resistance in low or particles whose surface electric resistance is high but can be reduced by surface treatment are preferred. These particles have an average particle size of preferably about 0.01 $\mu$m to 3 $\mu$m, more preferably, 0.01 $\mu$m to 1.0 $\mu$m.

The non-magnetic particles of the present invention comprise at least 50 wt % of the above described carbon, and further comprise 0 to 50 wt % of other fine particles, based on the total weight amount of particles. The amount of non-magnetic particles to total binder contained in the backing layer is 40 to 300 parts by weight of non-magnetic particles, and preferably 75 to 200 parts by weight of non-magnetic particles, per 100 parts by weight of binder. When the amount of non-magnetic particles exceeds 300 parts by weight of non-magnetic particles, adhesion of the non-magnetic support to the backing layer deteriorates and drop out readily increases after repeated run. When the amount of non-magnetic particles is under 40 parts by weight of non-magnetic particles, satisfactory surface electric resistance of a tape can hardly be kept and noise generated by discharge between the tape and deck head is detected as drop out.

In the present invention, various dispersing agents and lubricants can further be contained.

Dispersing agents which can be used in the backing layer of the present invention include a fatty acid having 12 to 18 carbon atoms ($R_1$ COOH, wherein $R_1$ is an alkyl group having 11 to 17 carbon atoms) such as caprylic acid, capric acid, lauric acid, myristic acid, palmitic acid, stearic acid, oleic acid, elaidic acid, linoleic acid, linolenic acid or stearol acid; metal soaps comprise an alkali metal (Li, Na, K) of the fatty acid, and an alkali earth metal (Mg, Ca, Ba), Pb or Cu of the fatty acid; and lecithin.

Lubricating agents which can be used in the backing layer of the present invention include molybdenum disulfide, tungsten disulfide, fatty acid esters comprise monobasic fatty acid having 12 to 16 carbon atoms and monovalent alcohol having 3 to 12 carbon atoms, fatty acid esters comprise monobasic fatty acid having 17 or more of carbon atoms and monovalent alcohol having 21 to 23 carbon atoms including the number of carbon atoms in the fatty acid, and silicon compounds such as dimethylpolysiloxane or methyl phenyl siloxane.

Classification between dispersing agents and lubricanting agents is not clear and there are many compounds which have both of the above described functions.

Solvents which can be used for mixing, kneading and coating the composition for the backing layer in the present invention include ketones such as acetone, methyl ethyl ketone, methyl isobutyl ketone or cyclohexanone; alcohols such as methanol, ethanol, propanol or butanol; esters such as methyl acetate, ethyl acetate, butyl acetate, ethyl lactate, glycol acetate or monoethyl ether; glycol ethers such as esther, glycol dimethyl ether, glycol monoethyl ether or dioxane; tars (aromatic hydrocarbons) such as benzene, toluene or xylene; chlorinated hydrocarbons such as methylene chloride, ethylene chloride, carbon tetrachloride, chloroform, ethylene chlorohydrin or dichlorobenzene and water, in an optional mixing ratio.

For preparing a magnetic recording layer or a backing layer, the components of the respective layer can optionally be combined, or dispersed in an organic solvent to prepare a coating composition which can then be coated on a support.

When a magnetic recording medium is used as a tape, the thickness of the support is about 2.5 to 100 μm, preferably 3 to 40 μm. Materials for the support include polyesters such as polyethylene terephthalate or polyethylene naphthalate, polyolefines such as polypropylene, cellulose derivatives such as cellulose triacetate or cellulose diacetate, vinyl tape resins such as polyvinyl chloride, plastics such as polycarbonate, ceramics, glass, and metals such as aluminum or copper.

The components of the coating dispersion (carbon black, binders, solvents and particles) used for preparing the backing layer of the present invention can be dispersed by a ball mill, a pebble mill, a sand grinder, an atomizer, a three roll mill, a high speed impeller dispersing device, or a high speed stone mill.

A suitable method for coating the backing layer on a support include an air doctor coating method, a blade coating method, an air knife coating method, a squeeze coating method, a dip coating method, a reverse roll coating method, a transfer roll coating method, a gravure coating method, a kiss coating method, a cast coating method, a spray coating method, and a bar coating method. Other coating methods can be used. These coating methods are disclosed in more detail in "Coating Engineering", pages 253 to 277, published by Asakura Shoten on Mar. 20, 1971.

The dry thickness of the backing layer is preferably 1.5 μm to 2.5 μm.

The present invention is further illustrated in more detail by the following Examples. It will be understood by those skilled in this art that materials quantities and operation orders can be changed so long as the gist of the present invention is not essentially changed. Accordingly the present invention should not be limited to the following Examples. In the Examples, all parts are by weight.

EXAMPLE 1

The following composition was introduced into a ball mill, mixed and kneaded sufficiently and 40 parts of "Des-module L-75" of TDI (tolylenediisocyanate) type hardening agents (a trade name of a polyisocyanate compound, manufactured by Bayer Co., Ltd.), were added thereto and were mixed and dispersed homogeneously to prepare a magnetic coating composition.

| | |
|---|---|
| Co-containing γ-Fe₂O₃ | 300 parts |
| (Specific surface area measured by the nitrogen absorption method: 30 m²/g, Coecive force of powder: HC = 600 Oe) | |
| Vinyl chloride/vinyl acetate compound (86/13) | 30 parts |
| ("VMCH", a trade name, manufactured by Union Carbide, Co., Ltd.) | |
| "Nippollan N2304" (Nippon Polyurethane) | 15 parts |
| Carbon black (Average particle size: 0.017 μm) | 20 parts |
| Lecithin | 3 parts |
| Oleic acid | 5 parts |
| Octyl laurate | 3 parts |
| Lauric acid | 3 parts |
| Butyl acetate | 330 parts |
| Methyl ethyl ketone | 660 parts |

The magnetic coating composition was coated on a polyethylene terephthalate support (thickness: 20 μm) and dried to form a magnetic layer (dry thickness: 5 μm).

Six different backing layer compositions were then prepared, with each backing layer composition being identical except for the nature of the second carbon black that is contained. The composition for the backing layer is shown in the following formulation where the second carbon black is identified as carbon black (X), with the identity of (X) being shown in Table 1. The following composition for a backing layer was mixed and kneaded in a ball mill, and 30 parts of "Collonate 2061" (a trade name of a polyisocyanate, manufactured by Nippon Polyurethane Co., Ltd.) were added thereto and were mixed and dispersed homogeneously to form a backing layer coating composition. Each of the backing layer coating composition was coated on the surface of the polyester support prepared in the above manner opposite to the magnetic layer in a thickness of 2 μm.

| | |
|---|---|
| Carbon black | 100 parts |
| ("Raven MTP", average particle size: 0.250 μm) | |
| Cr₂O₃ (average particle size: 0.7 μm) | 1 part |
| Carbon black (X) (Shown in Table 1 below) | 100 parts |
| Al₂O₃ (average particle size: 0.7 μm) | 1 part |
| "Nippollan 2304" (manufactured by Nippon Polyurethane Co., Ltd.) | 80 parts |
| Saran resin (Dow-Chemical Co., LTd.) | 30 parts |
| Copper oleate | 1 part |
| Stearic acid | 0.5 part |
| Methyl ethyl ketone | 450 parts |
| Cyclohexanone | 50 parts |

Each resulting tape was subjected to a calendering treatment (which is treated for 14 times at 90° C., 300 kg of line pressure and 150 m/min.) to make its surface mirror-like and slit to a 1 inch width to prepare Sample Nos. 1 to 6 (Sample No. 1 is a comparative sample containing "Raven MTP" as the first and second carbon black. Sample Nos. 2 to 6 contain Carbon black (x) shown in Table 1 as the second carbon black). The properties of sample tapes were evaluated and the results are shown in Table 1.

TABLE 1

| Sample No. | Carbon black (X) | Average particle size (μm) | Peel apart at calendering at 90° C. | RF output (dB) | Number of drop out | Ra value | Audio level fluctuation (dB) |
|---|---|---|---|---|---|---|---|
| 1 | Raven MTP | 0.25 | C | 0 | 190 | 0.15 | 0.8 |
| 2 | Asahi Thermal | 0.09 | B | −0.9 | 20 | 0.14 | 0.1 |
| 3 | Asahi #50 | 0.094 | A | −1.5 | 31 | 0.14 | 0.1 |
| 4 | Asahi #60 | 0.050 | A | −1.6 | 19 | 0.12 | 0.0 |

TABLE 1-continued

| Sample No. | Carbon black (X) | Average particle size (μm) | Peel apart at calendering at 90° C. | RF output (dB) | Number of drop out | Ra value | Audio level fluctuation (dB) |
|---|---|---|---|---|---|---|---|
| 5 | Asahi #70 | 0.027 | A | −1.9 | 18 | 0.10 | 0.1 |
| 6 | Asahi #80 | 0.023 | A | −2.1 | 15 | 0.10 | 0.3 |

Peel apart at calendering:
Degree that a backing layer was peeled apart from a support is evaluated by the following three grade evaluation.

A: The backing layer was not peeled apart at all.
B: 5% or less of the backing layer was peeled apart.
C: More than 5% of the backing layer was peeled apart.

RF output:
The value is shown by a relative dB value when recording and reproducing was conducted at 4 MHz.

Ra value:
A surface roughness in cut off of 0.8 mm of a backing layer which was subjected to calendering treatment at 90° C., was measured in accordance with JIS B 0601-1982.

Number of drop out:
The number of drop out in Table 1 is counted after repeated run for 100 passes. The number of drop out is shown by the number of occurrence of drop out for 15μ sec or more per 5 minutes measured by a drop out counter where the reproduced output level decreased by 16 dB or more. Drop out measured at 25° C. and 60% RH using sample tapes which had been subjected to repeated running in an air conditioned room at 25° C. and 40% RH and were allowed to stand at the room temperature for 1 week.

Audio level fluctuation:
Using a deck for magnetic recording and reproducing having a guide pole slanted at 15° toward the running direction of a magnetic recording medium, audio output fluctuation was measured by recording and reproducing sine were signals of 1 KHz at a standard input level on the whole length of the sample tapes which had been run for 300 times and the maximum value of output fluctuation of the reproduced output level was shown by a relative value dB. The output fluctuation becomes worse as the maximum value of output fluctuation increases as shown by a large value dB. It becomes better as the maximum value of output fluctuation decreases as shown by a value dB near to 0 dB.

EXAMPLE 2

The following composition was introduced into a ball mill, mixed and kneaded sufficiently, and 20 parts of "Des-module L-75" of TDI (tolylenediisocyanate) type hardening agents (a trade nams of a polyisocyanate compound manufactured by Bayer Co., Ltd.) were added thereto, and were mixed and dispersed homogeneously to prepare a magnetic coating composition.

| | |
|---|---|
| Co-containing γ-$Fe_2O_3$ | 300 parts |
| (Specific surface area measured by the nitrogen absorption method: 35 $m^2$/g, Coecive force of powder: HC = 800 Oe) | |
| Copolymer of vinyl chloride/vinyl acetate/vinyl alcohol (87/5/8) | 30 parts |
| (Degree of polymerization: about 400) | |
| Epoxy resin | 10 parts |
| (Epoxy group content: 0.56) | |
| Carbon black (Average particle size: 0.09 μm) | 5 parts |
| Lecithin | 3 parts |
| Oleic acid | 1 part |
| Octyl laurate | 3 parts |
| Lauric acid | 4.5 parts |
| Butyl acetate | 330 parts |
| Methyl isobutyl ketone | 660 parts |

The resulting magnetic coating composition was coated on a polyester support film (thickness: 10 μm) to form a magnetic layer (dry thickness: 4 μm).

A coating composition for a backing layer having the following formulation was prepared in a ball mill and was coated on the surface of the non-magnetic support opposite to the magnetic layer in a 2 μm thickness.

| | |
|---|---|
| Carbon black ("Asahi #50: 0.094 μm) | 50 parts |
| Carbon black ("Raven MTP", Average particle size: 0.250 μm) | 50 parts |
| Talc (bentonite) | 50 parts |
| Graphite | 50 parts |
| "Nippollan-2304" (Nippon Polyurethane Co., Ltd.) | 50 parts |
| Saran resin (Dow-Chemical Co., Ltd.) | 25 parts |
| "Collonate 2014" | 25 parts |
| Methyl ethyl ketone | 450 parts |
| Cyclohexanone | 50 parts |

The resulting tape was subjected to a calendering treatment to make its surface mirror-like and was slit to ½ inch width to prepare a sample No. 7.

EXAMPLE 3

A magnetic layer was provided on a non-magnetic polyester support in the same manner as in Example 2.

Then, the following composition for a backing layer was prepared in a ball mill and was coated on the surface of the non-magnetic support opposite to the magnetic layer in a 2 μm thickness.

| | |
|---|---|
| Carbon black ("Asahi #50: 0.094 μm) | 50 parts |
| Carbon black ("Raven MTP", Average particle size: 0.25 μm) | 50 parts |
| "Nippollan N 2304"(Nippon Polyurethane Co., Ltd.) | 50 parts |
| Phenoxy resin ("PKHH" manufactured by Union Carbide Co., Ltd.) | 20 parts |
| "Collonate 2014" | 30 parts |
| Methyl ethyl ketone | 450 parts |
| Cyclohexanone | 50 parts |

In the same procedure as in Example 2, a tape was slit to ½ inch width to prepare a Sample No. 8.

COMPARATIVE EXAMPLE 1

The same procedure as in Example 2 was repeated to prepare a Sample No. 9 except that nitrocellulose (nitration degree: 11.1%, molecular weight: 10,000) was used instead of "Nippollan 2304" in the composition for the backing layer.

COMPARATIVE EXAMPLE 2

The same procedure as in Example 3 was repeated to prepare a Sample No. 10 except that two types of carbon black (the first and second carbon black) were used in an amount of 15 parts, respectively, for each type in the composition for the backing layer in Example 3.

COMPARATIVE EXAMPLE 3

The same procedure as in Example 3 was repeated to prepare a Sample No. 11, except that two types of carbon black (the first and second carbon black) were used in an amount of 200 parts, respectively, for each type in the composition for the backing layer in Example 3.

The results of evaluation on those sample tapes are shown in Table 2.

TABLE 2

| Sample No. | Particle/ Binder/Ratio (P/B) | Per 100 parts of the total non-magnetic particles | | Binder of 100% modulus | Scratches | Number of drop out | Audio level fluctuation (d/B) |
| | | Coarse carbon black (parts) | Fine carbon black (parts) | | | | |
| --- | --- | --- | --- | --- | --- | --- | --- |
| 7 (Invention) | 200/100 | 25 | 25 | 150 kg/cm$^2$ or less | A | 15 | 0.2 |
| 8 (Invention) | 100/100 | 50 | 50 | 150 kg/cm$^2$ or less | A | 22 | 0.2 |
| 9 (Comparison) | 200/100 | 25 | 25 | 150 kg/cm$^2$ or more | C | 321 | 0.1 |
| 10 (Comparison) | 30/100 | 50 | 50 | 150 kg/cm$^2$ or less | C | 270 | 2.0 or more |
| 11 (Comparison) | 400/100 | 50 | 50 | 150 kg/cm$^2$ or less | B | 167 | 1.4 |

Scratches:

Scratches formed on the backing layer were observed after sample tapes of 5 minutes length were subjected to repeated "play-rewind" on a deck for 250 passes. Scratches is evaluated by the following three grade evaluation.

A: Scratches was not observed at all.
B: 5 or less scratches were observed.
C: 6 or more scratches were observed.

Number of drop out:

The number of drop out is counted after sample tapes had been run for 250 passes. The number of drop out is shown by the number of occurrences of drop out for 15μ sec or more per 1 minute measured by a drop out counter where the reproduced output level decreased by 16 dB or more.

The other conditions were the same as those in Table 1.

It is apparent from the results shown in Tables 1 and 2 that excellent properties regarding increase of drop out after repeated run, scratch resistance of the backing layer and audio level fluctuation can be obtained by a suitable combination of particle/binder ratio (P/B), a combination of the two types of carbon black and resin having the desired 100% modulus of 150 kg/cm$^2$ or less. Further, the combination of the present invention is the most suitable, since a calendering treatment at a higher temperature is desirable to produce higher output, and the present invention enables such a calendering treatment to be performed.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support having provided thereon a magnetic layer being provided on one surface of the support and a backing layer being provided on the surface of the support opposite to said magnetic layer, the backing layer containing (A) a binder comprised of resin having a 100% modulus of 150 kg/cm$^2$ or less present in an amount of 50 to 95 wt % based on the total weight amount of binder and (B) non-magnetic particles comprised of (i) carbon black having an average particle size of more than 0.1 μm to 1.0 μm, and (ii) carbon black having an average particle size of 0.01 μm to 0.1 μm in a weight ratio of carbon black (i)/carbon black (ii) of 95/5 to 5/95, with the non-magnetic particles in the backing layer being present in an amount of 40 to 300 parts by weight per 100 parts by weight of the total binder.

2. The magnetic recording medium as claimed in claim 1, wherein the binder is comprised of a resin having a 100% modulus of 120 kg/cm$^2$ or less.

3. The magnetic recording medium as claimed in claim 1, wherein the binder is comprised of a polyisocyanate hardening agent present in an amount of 15 to 40 wt % based on the total amount of binder.

4. The magnetic recording medium as claimed in claim 1, wherein the carbon black comprises at least 50 wt % of the non-magnetic particles.

5. The magnetic recording medium as claimed in claim 1, wherein the non-magnetic particles comprised of (i) carbon black having an average particle size of 0.1 μm to 0.5 μm, and (ii) carbon black having an average particle size of 0.015 μm to 0.095 μm in a weight ratio of carbon black (i)/carbon black (ii) of 80/20 to 20/80.

* * * * *